United States Patent
Larsson

[19]

[11] Patent Number: 6,164,176
[45] Date of Patent: Dec. 26, 2000

[54] WOODWORKING ACCESSORY FOR MAKING TAPERED CUTS ON A WORKPIECE

[76] Inventor: Bruce O. Larsson, 14 George St., Dudley, Mass. 01571

[21] Appl. No.: 09/182,605

[22] Filed: Oct. 29, 1998

[51] Int. Cl.[7] .................................................. B27B 27/02
[52] U.S. Cl. .......................... 83/435.12; 83/412; 83/468.3
[58] Field of Search ........................... 83/435.12, 435.13, 83/435.14, 412, 468.3, 415, 581, 432

[56] References Cited

U.S. PATENT DOCUMENTS

| | | | |
|---|---|---|---|
| 1,267,447 | 5/1918 | Phelan | 269/318 |
| 1,831,124 | 11/1931 | Koster | 83/435.12 |
| 2,032,976 | 3/1936 | Carter | 83/435.12 |
| 2,085,236 | 6/1937 | Tautz | 83/412 |
| 2,524,168 | 10/1950 | Harnish, Jr. et al. | 269/297 |
| 2,672,897 | 3/1954 | Cue | 83/435.12 |
| 2,803,271 | 8/1957 | Shaw | 83/468.3 |
| 2,895,513 | 7/1959 | Cowley | 83/435.14 |
| 3,116,769 | 1/1964 | Gunderson | 83/412 |
| 3,498,348 | 3/1970 | Spalding | 83/412 |
| 4,002,329 | 1/1977 | Petrowski | 83/435.12 |
| 4,164,882 | 8/1979 | Mericle | 83/435.12 |
| 5,038,486 | 8/1991 | Ducate, Sr. | 83/435.12 |
| 5,176,058 | 1/1993 | Skelly | 83/435.12 |
| 5,191,821 | 3/1993 | Metzger, Jr. et al. | 83/435.12 |
| 5,205,198 | 4/1993 | Foray et al. | 83/435.12 |
| 5,771,767 | 6/1998 | Itami | 83/435.13 |

OTHER PUBLICATIONS

Fine Woodworking, Oct. 1998, vol. 132, p. 16.
Wood Magazine, Feb. 1997, Issue No. 95, p. 10.

*Primary Examiner*—Kenneth E. Peterson
*Assistant Examiner*—Stephen Choi
*Attorney, Agent, or Firm*—Blodgett & Blodgett, P.C.

[57] ABSTRACT

A fixture for use with a saw table or router table for supporting an elongated workpiece used in conjunction with the rip fence mounted on the table. The fixture has a first rail pivotally connected at one end to one end of a second rail. The first rail is adapted to be guided along the rip fence, while the second rail can be pivoted to an angular positions relative to the first rail. The second rail has a longitudinal guide surface that can assume a plurality of angular positions relative to the rip fence. A head end retaining mechanism is connected to one of the rails for holding one end of a workpiece at a fixed point relative to the longitudinal guide surface. A tail end retaining mechanism is connected to one of the rails for maintaining the opposite end of a workpiece at a fixed point relative to the longitudinal guide surface. The tail end retaining mechanism is adjustable vertically and horizontally toward and away from the longitudinal guide surface. One or both of the head end retaining mechanism and the tail end retaining mechanism is adjustable longitudinally to accommodate workpieces of different lengths.

12 Claims, 10 Drawing Sheets

WOODWORKING ACCESSORY FOR MAKING TAPERED CUTS ON A WORKPIECE

CROSS-REFERENCE TO RELATED APPLICATIONS

NOT APPLICABLE

STATEMENT REGARDING FEDERALLY SPONSORED RESEARCH OR DEVELOPMENT

This invention has been created without the sponsorship or funding of any federally sponsored research or development program.

BACKGROUND OF THE INVENTION

The present invention relates generally to a jig or a fixture for a table saw and/or router for making tapered cuts on an elongated workpiece. More specifically, the invention relates to a fixture for securing an elongated narrow workpiece, such as a table leg, to form consistent angled cuts on the workpiece when used on a table cutter that includes a saw blade, a router bit or shaper cutter, and an adjustable ripping fence. Conventional tapering jigs or fixtures are not equipped with means for securing or supporting a workpiece to the fixture. During the shaping or milling process, the workpiece is held in place by a spinning cutter head which exerts force into the workpiece towards the face of the fixture. The fixture is held against a fence that is mounted to the table saw, router, or shaper. This controls movement towards the fence. Front to rear movement of the fixture is controlled by a small 90° stop at the tail end of the fixture. Without means for securing the workpiece to the fixture, the workpiece is free to rise up and jam in the cutter head, thereby resulting in a "kicking back" of the workpiece towards the operator. Cutting more than two angles on a single workpiece only adds to the danger. Accuracy is also decreased because fence and angle adjustments are required. Additionally, some cuts such as octagonal tapers require blade angle changes as well. Conventional tapering jigs and fixtures are also limited to use on a table saw and cannot accommodate round, turned, or small odd shaped workpieces on a router or shaper table. This type of mill work usually requires a fabrication of a jig or fixture that is unique to the individual workpiece. Even slight angle adjustments to a given workpiece may require the use of an additional jig or fixture. This procedure is to tedious, time consuming, and inefficient. Also with many of these home made jigs or fixtures, such as the common "sled", the operators hands must be positioned dangerously close to the cutter head. These and other difficulties experienced with the prior art jigs and fixtures for making tapered cuts on a workpiece have been obviated by the present invention.

It is, therefore, a principal object of the invention to provide a fixture which eliminates the need for blade, fence, and angle adjustments when making complex cuts on an elongated workpiece.

A further object of the present invention is a provision of a fixture for making tapered cuts on a workpiece which prevents kickback of the workpiece.

Another object of the present invention is to provide a fixture for making angled cuts on an elongated workpiece in which the angled cuts can be made accurately and consistently on the same workpiece and repeated on additional similar workpieces.

A still further object of the present invention is the provision of a fixture for use of a table saw, a router/shaper table, or any combination of both.

With these and other objects in view, as will be apparent to those skilled in the art, the invention resides in the combination of parts set forth in the specification and covered by the claims appended hereto.

BRIEF SUMMARY OF THE INVENTION

In general, the invention consists of a fixture for use with a saw table or router table for supporting an elongated workpiece used in conjunction with the rip fence of the table. The fixture has a first rail pivotally connected at one end to one end of a second rail. The first rail is adapted to be guided along the rip fence, while the second rail can be set in a plurality of angular positions relative to the first rail. The second rail has a longitudinal guide surface that can assume a plurality of angular positions relative to the rip fence. A head end retaining mechanism is connected to one of the rails for holding one end of a workpiece at a fixed point relative to the longitudinal guide surface. A tail end retaining mechanism is connected to one of the rails for maintaining the opposite end of a workpiece at a fixed point relative to the longitudinal guide surface. The tail end retaining mechanism is adjustable vertically and horizontally toward and away from the longitudinal guide surface. One or both of the head end retaining mechanism and the tail end retaining mechanism is adjustable longitudinally to accommodate workpieces of different lengths.

BRIEF DESCRIPTION OF THE DRAWINGS

The character of the invention, however, may be best understood by reference to one of its structural forms, as illustrated by the accompanying drawings, in which.

DETAILED DESCRIPTION OF THE INVENTION

Referring first to FIGS. 1–4, the table saw fixture of the present invention is generally indicated by the reference numeral 10, and comprises an elongated first rail, generally indicated by the reference numeral 12, an elongated second rail, generally indicated by the reference numeral 14, a tail end retaining mechanism, generally indicated by the reference numeral 16, and a head end retaining mechanism, generally indicated by the reference numeral 18. The fixture 10 is shown applied to a table saw, generally indicated by the reference numeral 20. The table saw 20 includes a table 22 and a rip fence 21 mounted on the upper surface 23 of the table. The rip fence 21 has a longitudinal vertical guide surface 25. The table saw also includes a blade 26 that extends through a slot 24 in the table. The blade 26 normally extends in a vertical plane that is transverse to the surface 23 of the table and parallel to the rip fence 21.

Figure 1:
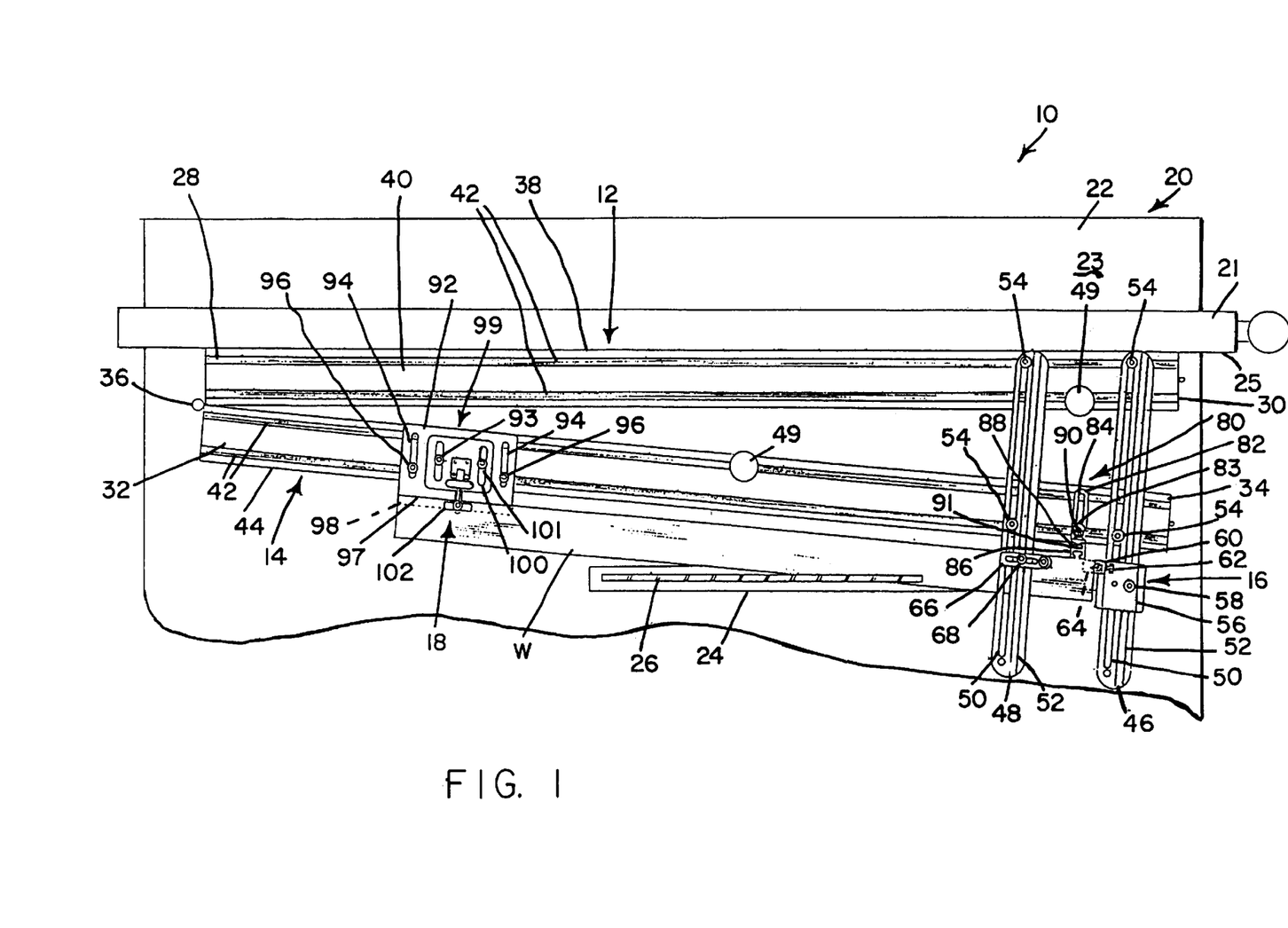
FIG. 1 is a plan view of the fixture for a table saw embodying the principals of the present invention.
Figure 3:
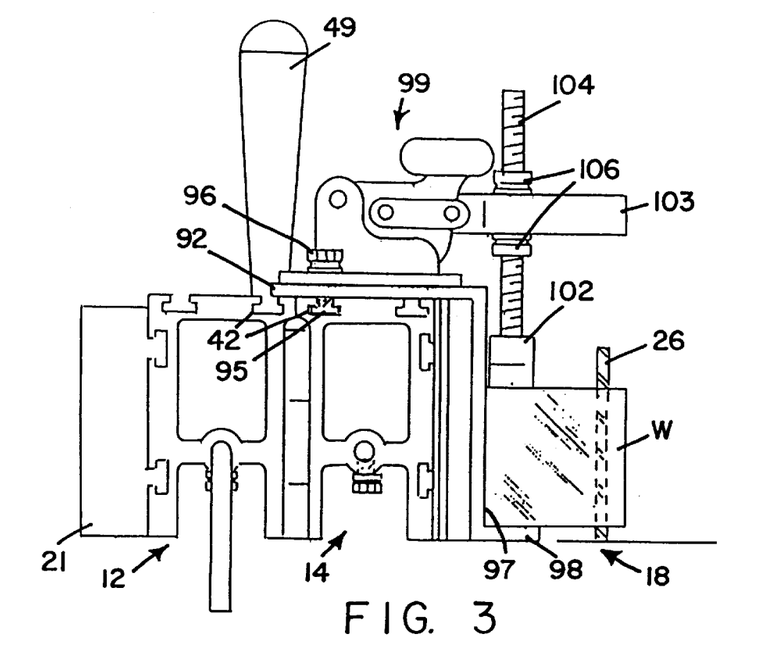
FIG. 3 is a front elevational view of the fixture, showing the fixture in a non adjusted position.
Figure 4:
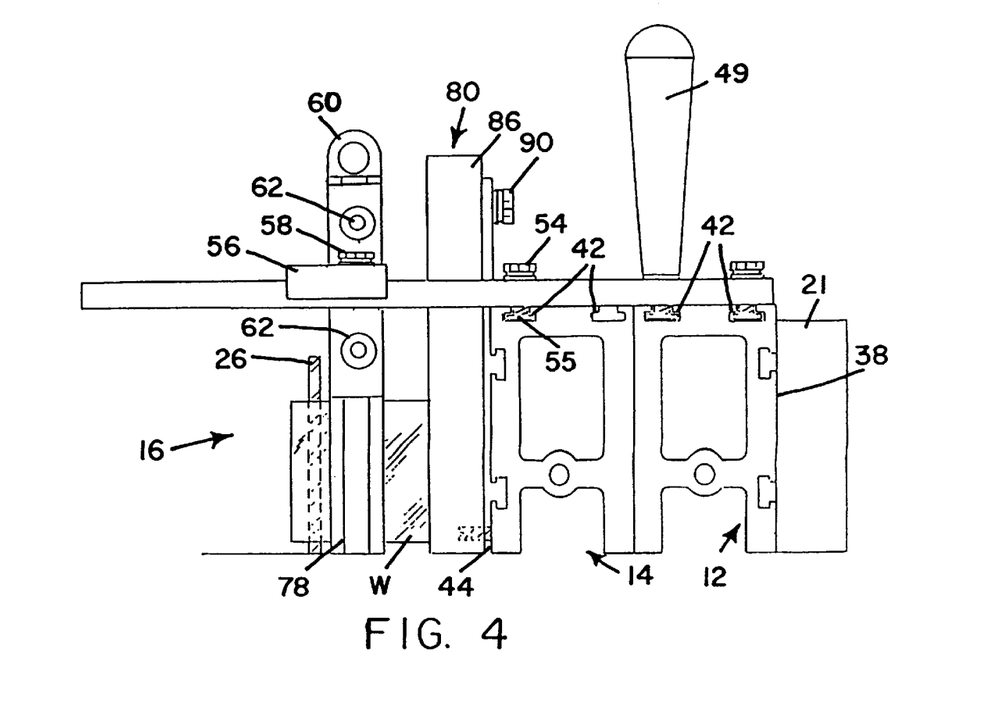
FIG. 4 is a rear elevational view of the fixture, showing the fixture in a non adjusted position.

The first rail 12 has a head end 28 and a tail end 30. The second rail 14 has a head end 32 and a tail end 34. The head end 28 of the first rail is pivotally connected to the head end 32 of the second rail by a hinge 36. The first rail 12 has a first vertical longitudinal guide surface 38 and at least one upwardly facing T groove 42. The second rail 14 has a second vertical longitudinal guide surface 44 and at least one upwardly facing T slot 42 in its upper surface. Each of the first and second rails 12 and 14, respectively, has an upwardly extending handle 49 removably mounted in a respective T slot 42. The rip fence 21 has a longitudinal vertical guide surface 25 that is parallel to and faces the saw blade 26. The first vertical guide surface 38 of the first rail 12 is adapted to abut the guide surface 25 of the rail, as shown in FIG. 1. The second vertical guide surface 44 of the second rail 14 is parallel to the first vertical guide surface 38 when the fixture 10 is in its non-adjusted or parallel position, as shown in FIGS. 3 and 4. Thereafter, the second guide surface 44 can assume a plurality of angular positions relative to the first vertical guide surface 38 when the second rail 14 is pivoted relative to the first rail 12 about the hinge 36, one such angular position is being shown in FIG. 1. The cut being made on the workpiece W, as shown in FIG. 1, is more extreme than would be warranted for a workpiece of the size shown and is so depicted only for illustrative purposes.

Figure 2:
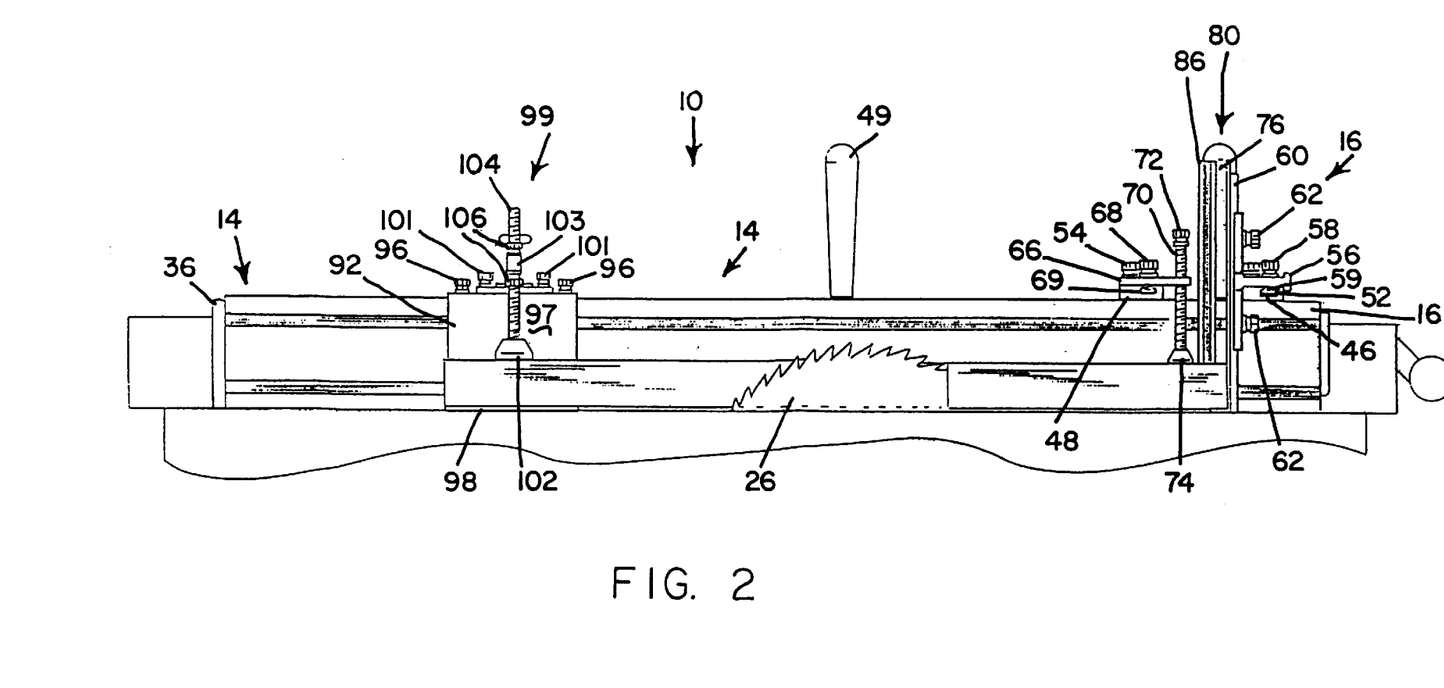
FIG. 2 is a side elevational view of the fixture.
Figure 7:
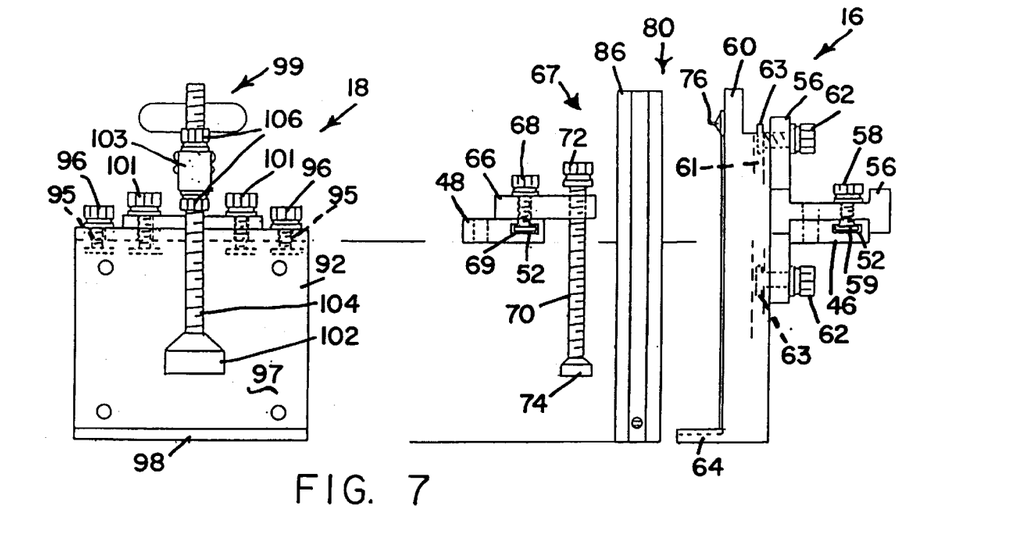
FIG. 7 is a side elevational view of the fixture without a workpiece and shown on an enlarged scale with portions broken away.

The tail end retaining mechanism 16 includes a pair of elongated first and second horizontal bars 46 and 48, respectively. Each of the bars 46 and 48 has a longitudinal slot 50 and a T groove 52 in its upper surface. Each of the bars 46 and 48 is mounted on the first and second rails 12 and 14, respectively, by nuts 54 which are threaded to bolts 55 which are slidably mounted in the T grooves 42. This enables the bars 46 and 48 to be adjusted longitudinally along the rails 12 and 14 and to be locked in any desired position along the rails. In addition to forming part of the tail end retaining mechanism 16, the bars 46 and 48 together with their locking nuts 54 and bolts 55 function as a locking mechanism for holding the second rail 14 at a given angle relative to the first rail 12. The tail end locking mechanism 16 also includes a first bracket 56 slidably mounted on the first horizontal bar 46. As shown more clearly in FIGS. 7 and 8, the bracket 56 is locked in a desired position on the bar 46 by a bolt 59 located in the T slot 52 which engages a locking nut 58. A vertical bar 60 is slidably mounted on the bracket 56 for vertical movement relative to the bracket 56. The bar 60 is locked in a desired position by locking nuts 62 which engage bolts 63 located in a T groove 61 along the rear side of the bar 60. A horizontal tab 64 is located at one end of the bar 60. A sharp horizontal projection 76 is located at the opposite end of the bar. The projection 76 and the horizontal tab 64 both face toward the head end retaining mechanism 18. A hold-down mechanism, generally indicated by the reference numeral 67, is mounted on the bar 48. The hold-down mechanism 67 includes a second bracket 66 mounted on the bar 48 for a longitudinal movement along the bar 48. The bracket 66 is locked in a desired position on the bar 48 by a locking nut 68 threaded onto a bolt 69 located in the T slot 52. The bracket 66 has a threaded aperture for receiving a threaded rod 70. A finger knob 72 is fixed to the upper end of the rod 70 and a stop member 74 is fixed to the lower end of the rod 70. The stop member 74 is adapted to engage the upper surface of a workpiece for clamping the workpiece between the stop member 74 and the horizontal tab 64, as shown in FIG. 2. An adjustable stop, generally indicated by the reference numeral 80, is mounted on the second rail 14. The adjustable stop 80 includes a L-shaped bracket 82 adjustably connected to the second rail 14 by a locking nut 83 which is threaded onto a bolt, not shown, located in one of the T grooves 42. The bolt extends through a slot 84 in the L-shaped bracket 82 to enable the bracket to be adjusted transversely of the second rail 14 toward and away from the workpiece W. The adjustable stop 80 also includes a vertical bar 86 which has a T groove 88 for receiving a bolt 91 that extends through the vertical arm of the L-shaped bracket 82 and threaded onto a locking nut 90. This enables the vertical bar 86 to be adjusted vertically relative to the L-shaped bracket 82. The entire adjustable stop 80 can also be adjusted longitudinally along the second rail 14 by loosening the lock nut 83. The vertical bar 86 extends vertically between the workpiece W and the second rail 14 for engaging the side of the workpiece facing the second rail 14 for preventing the workpiece from moving toward the second rail 14 during a milling cut on the workpiece.

Figure 5:
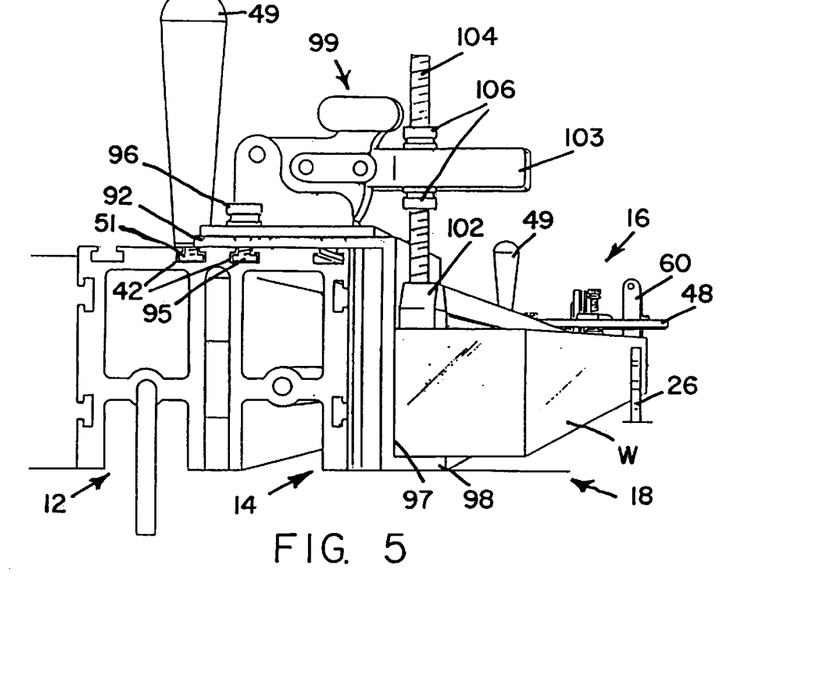
FIG. 5 is a front elevational view of the fixture, showing the fixture in an adjusted position for producing an angled milling cut on a workpiece.
Figure 6:
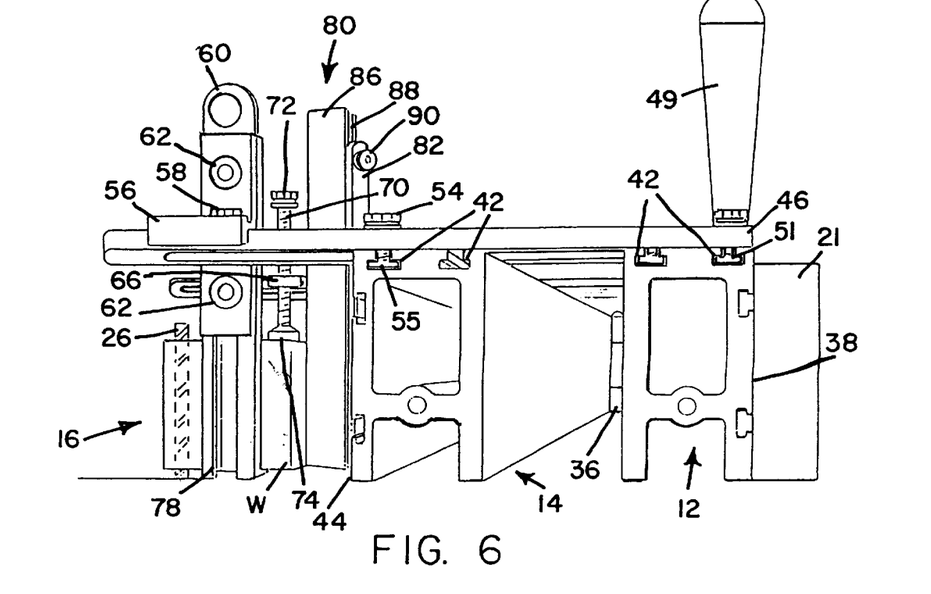
FIG. 6 is a rear elevational view of the fixture, showing the fixture in the same adjusted position as that of FIG. 5.
Figure 8:
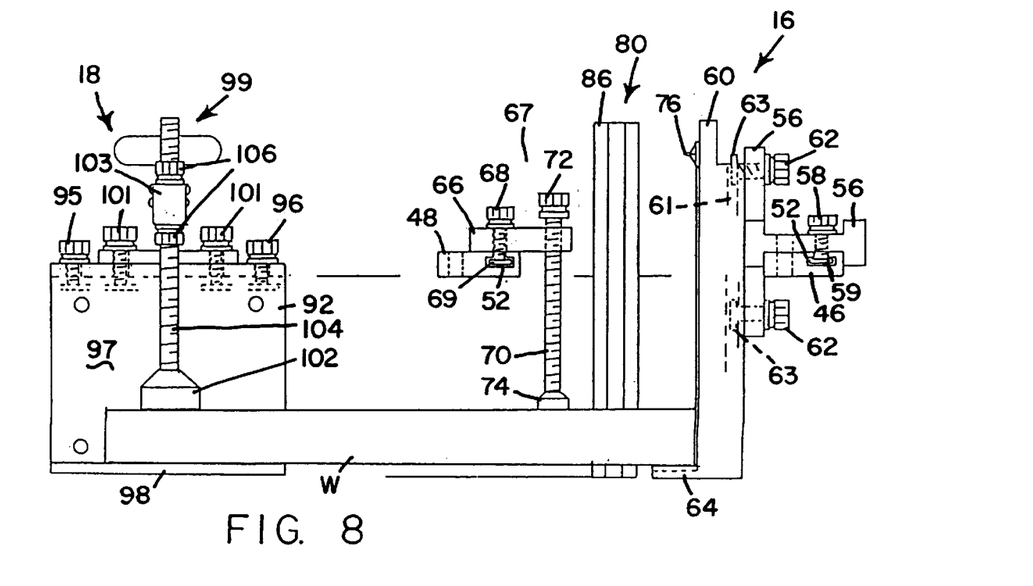
FIG. 8 is a side elevational view identical to FIG. 7, showing a workpiece in a secured position on the fixture.

The head end retaining mechanism 18 includes a supporting bracket 92 adjustably mounted on the second rail 14 for movement longitudinally along the rail and transversely of the rip fence. The supporting bracket 92 is locked in place by bolts 95 located in the T grooves 42 which extends through slots 94 in a supporting bracket 92 and are threadedly engaged with locking nuts 96. The supporting bracket 92 has a vertical bracing surface 97 for abutting the side of the workpiece W facing the rail 14 that braces the workpiece W and a lower horizontal tab 98 for engaging the bottom surface of the workpiece and for supporting the workpiece. A conventional toggle type clamping mechanism 99 is adjustably mounted on the supporting bracket 92 by means of bolts 93 extending through slots 100 for engaging locking nuts 101. The clamping mechanism 99 includes a horizontal lever 103 having a threaded vertical aperture through which extends a threaded rod 104 which can be locked in any desired vertical position by means of lock nuts 106. An engaging head 102 is fixed to the lower end of the rod 104 for engaging the top surface of the workpiece W and for clamping the workpiece between the engaging head 102 and the horizontal tab 98, as shown in FIGS. 5 and 8. The previously described apparatus will produce a table leg having four equal tapered sides.

Figure 9:
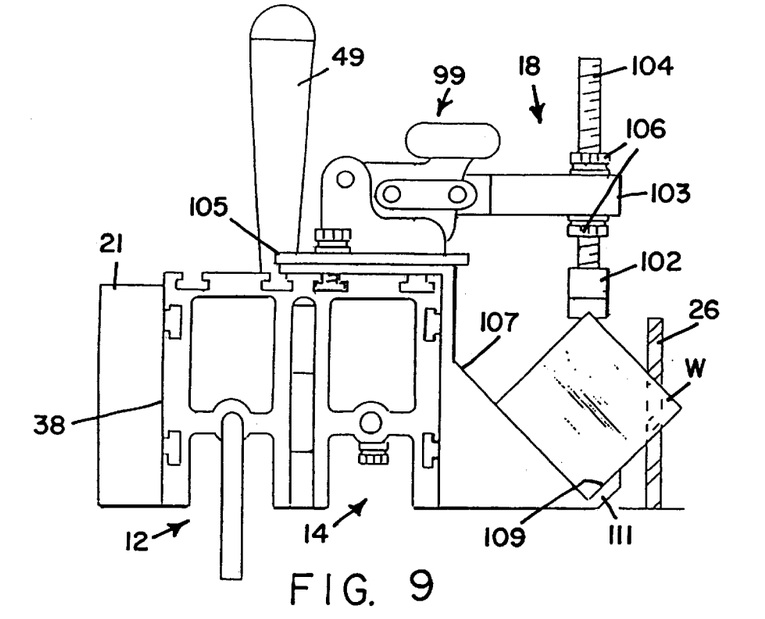
FIG. 9 is a front elevational view of the fixture, showing the fixture adapted for milling eight tapered sides on a workpiece.
Figure 10:
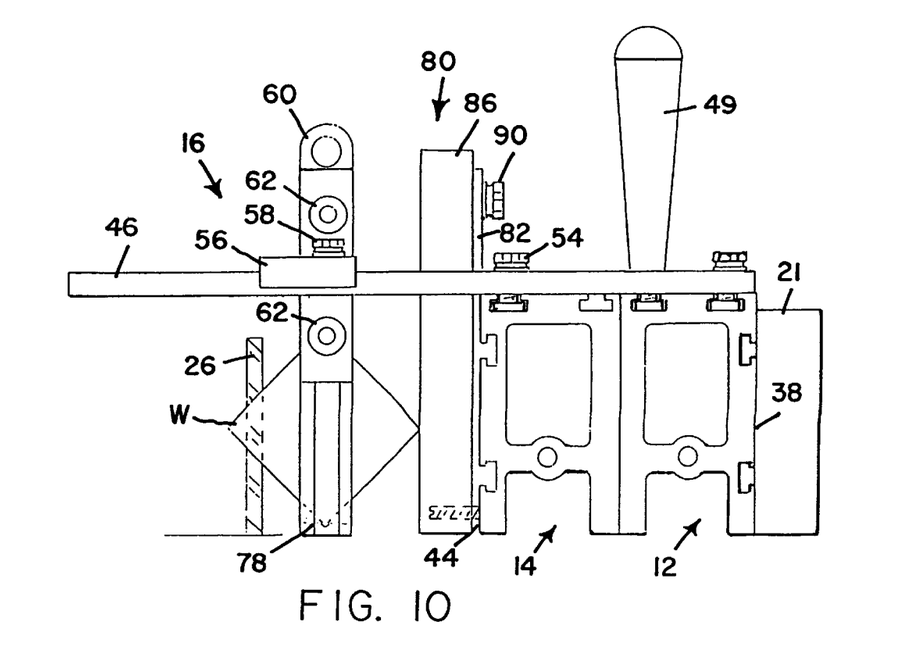
FIG. 10 is a rear elevational view of the fixture adapted for milling eight tapered sides on a workpiece.

If an octagonal or eight sided table leg is to be produced, the bracket 92 is replaced by a similar bracket 105, as shown in FIG. 9 and 10. Bracket 105 is identical to bracket 92 except that it has a 45° bracing surface 107 which faces upwardly away from the rail 14 and a tab 111 that has a 45° surface which faces upwardly toward the rail 14. Surfaces 107 and 109 form a V-shaped cradle for receiving the corners of the workpiece W, as shown in FIG. 9. This enables all four corners of the workpiece to be milled by the saw blade 26 to form a table leg having eight equal tapered sides. The supporting bracket 105 is designed to accommodate a workpiece having a specific cross-sectional dimension. Brackets 105 and 92 can be adjusted laterally to accommodate workpieces of different dimension. Shims can be placed between the supporting bracket 105 and the rail 14 to accommodate different stock sizes. These shims are provided in 1/16 increments to cover all possible standard sizes of stock.

The fixture 10 of the present invention is convertible for supporting a workpiece on router table equipped with a router blade for forming longitudinal groove or flute in the workpiece.

Figure 15:
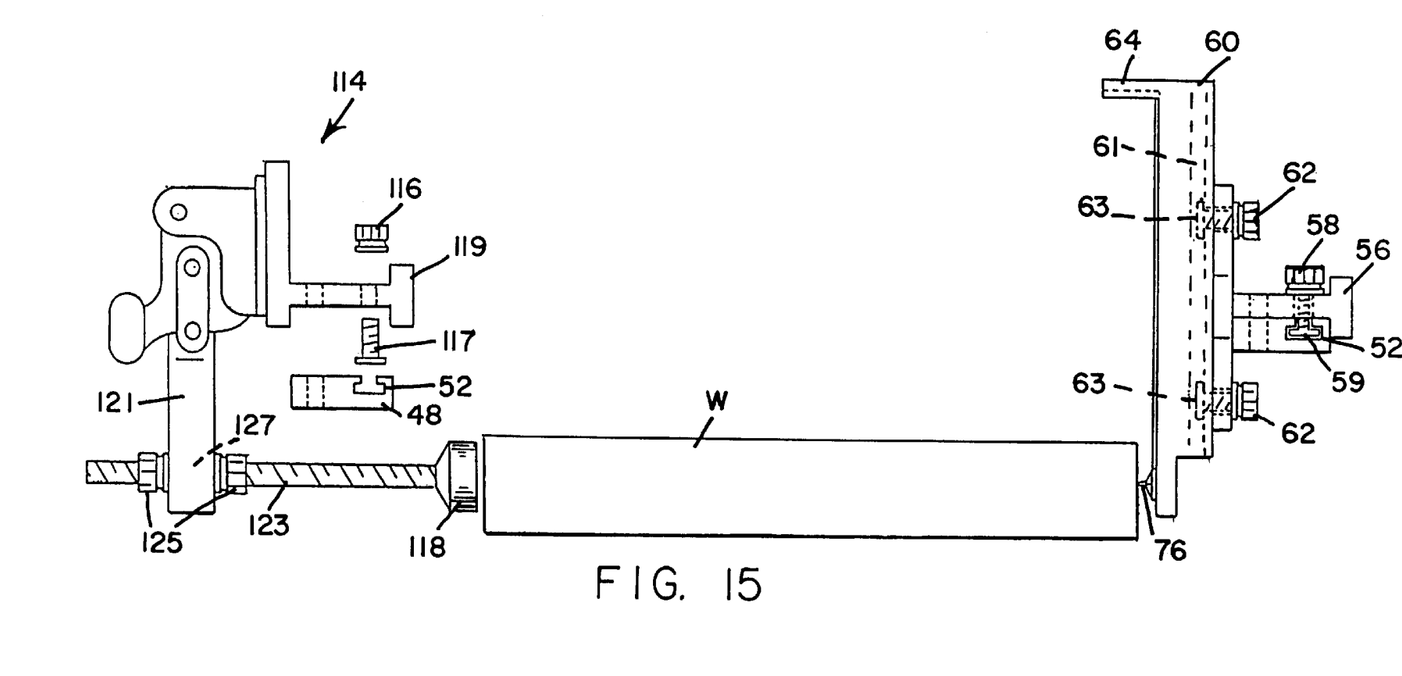
FIG. 15 is a side elevational view of the fixture in its router mode.

Referring to FIGS. 11–14, the fixture 10 is converted for use on a router table 20' by removing the bar 48 and associated elements from the tail end of the fixture. The router table 20' includes a longitudinal rip fence 21 and a router blade 112. The bar 48 is utilized at the head end of the fixture for supporting a modified head end retaining element. The vertical bar 60 is removed from the first bracket 56 and is re-inserted into the bracket 56 in an inverted position so that the horizontal tab 64 is at the top and the sharp projection 76 is at the bottom, as shown in FIG. 15. A L-shaped bracket 108 is mounted to a second vertical bar 86 for sliding vertical adjustment by means of a bolt located in the T groove 86 and a locking nut 110. The bolt extends through the vertical leg portion of the bracket 108 and is threaded into the bolt 110 for locking the L-shaped bracket 108 in a vertical position so that the horizontal leg portion of the bracket engages the top surface of the workpiece W. The sharp projection 76 is inserted into the center of the workpiece W at the tail end thereof for supporting the tail end of the workpiece. The L-shaped bracket 108 provides an upper stop for the workpiece to prevent upward movement of the workpiece as the workpiece is moved longitudinally over the router blade 112.

The bar 48 is moved to the head end of the fixture 10 for supporting a conventional toggle type clamping mechanism, generally indicated by the reference numeral 114, and a lateral clamping mechanism, generally indicated by the reference numeral 120. Referring particularly to FIG. 15, the clamping mechanism 114 is mounted to the bar 48 by a bolt 117 located in the T groove 52 and extending through an aperture in a bracket 119 for receiving a locking nut 116. This enables the clamping mechanism 114 to be moved longitudinally of the bar 48 and laterally of the rails 12 and 14. The clamping mechanism 114 includes a vertical downwardly extending bracket 121 which has a threaded horizontal aperture 127 for receiving a threaded rod 123 that is locked into any desired longitudinal position by locking nuts 125. An engaging head 118 is fixed to the end of the threaded rod 123 which faces the tail end retaining mechanism 16. As shown in FIG. 15, the engaging head 118 engages the head end of the workpiece W with pressure generated by the toggle effect of the clamping mechanism 114 for clamping the workpiece between the engaging head 118 and the sharp projection 76.

Figure 11:
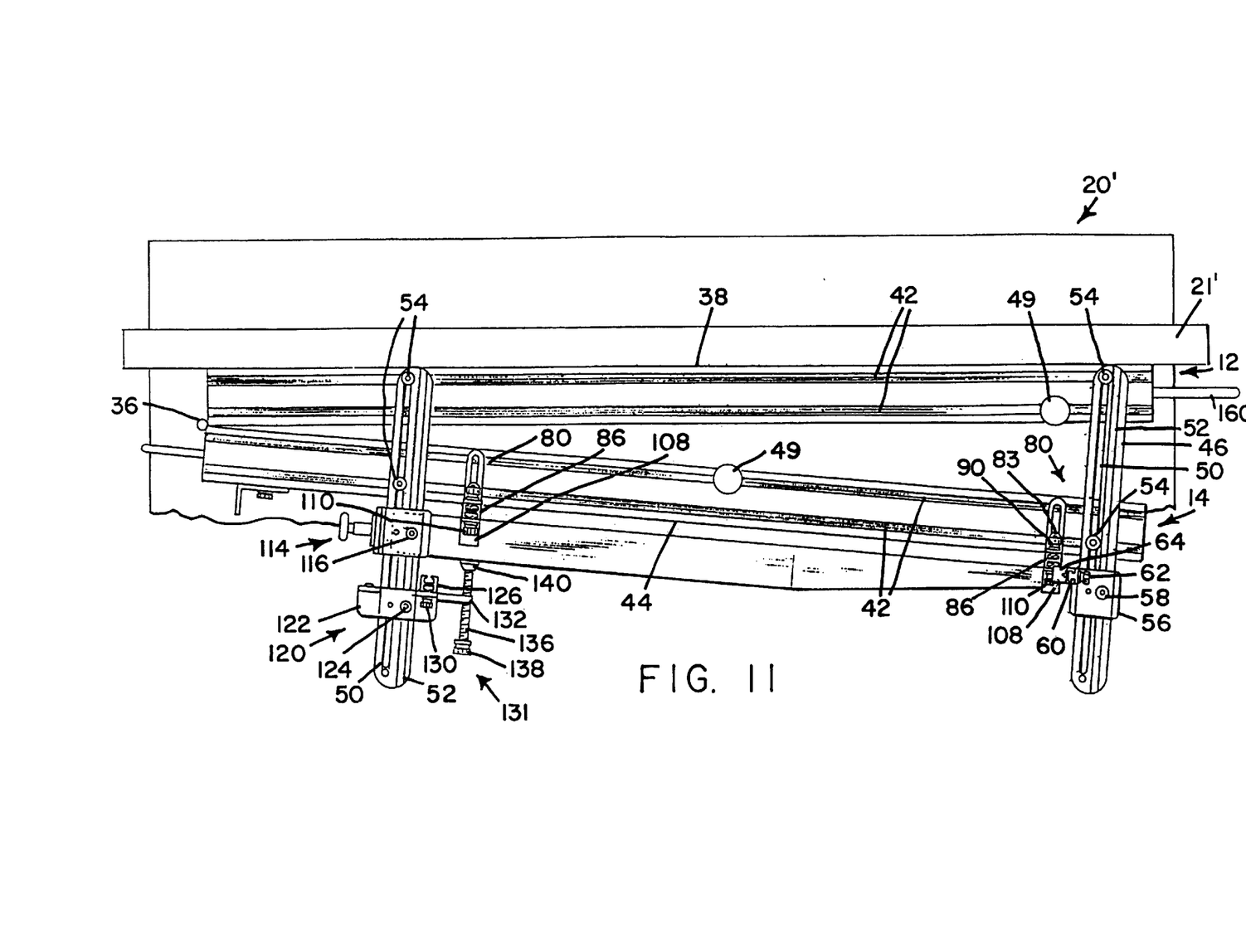
FIG. 11 is a top plan view of the fixture, showing the fixture adapted in its router mode for use on a router table for producing a longitudinal groove in a workpiece.
Figure 12:
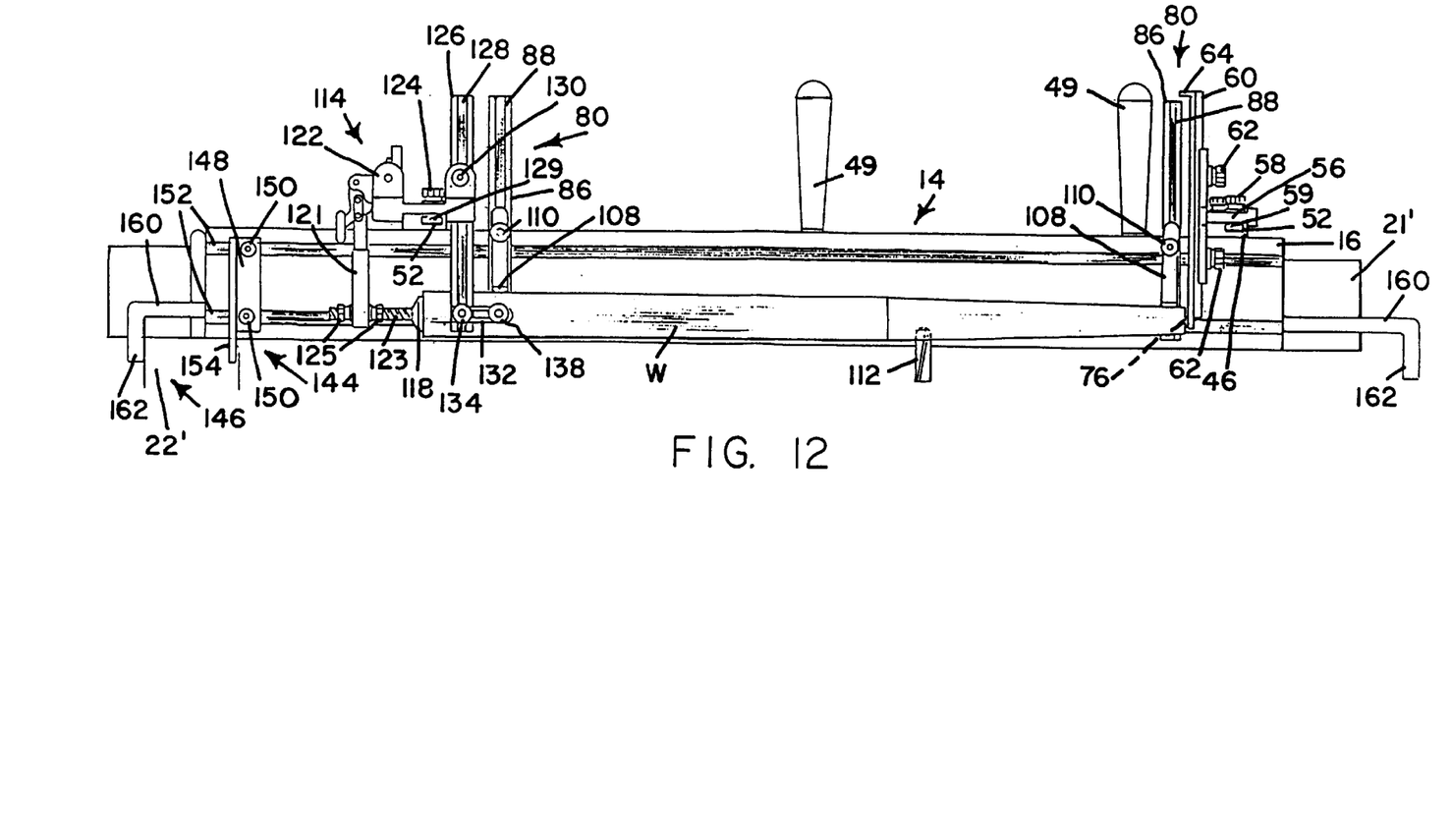
FIG. 12 is a side elevational view of the fixture in its router mode.
Figure 13:
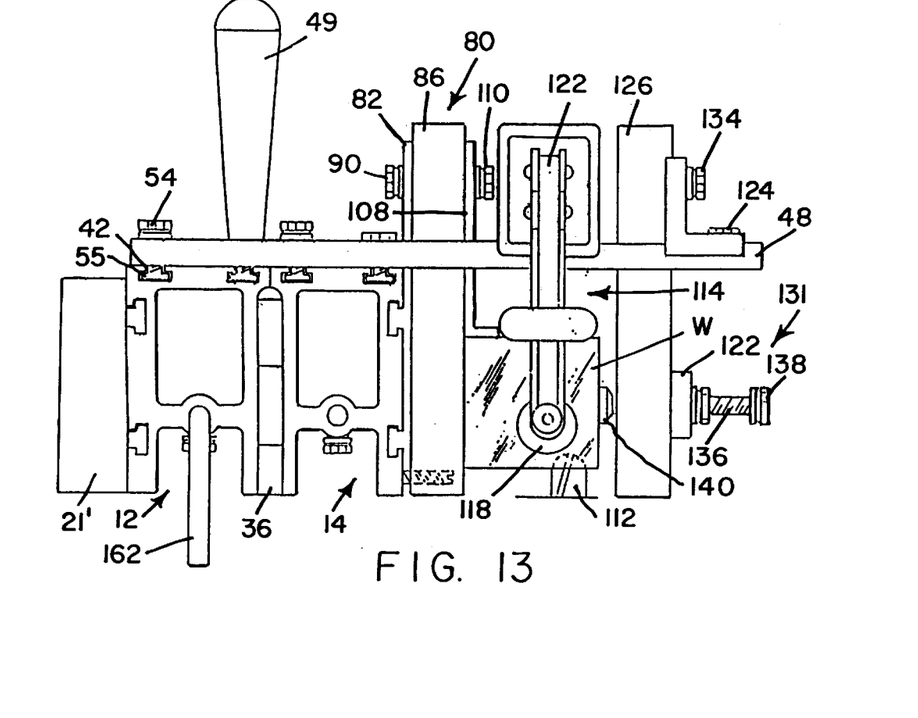
FIG. 13 is a front elevational view of the fixture in its router mode.
Figure 14:
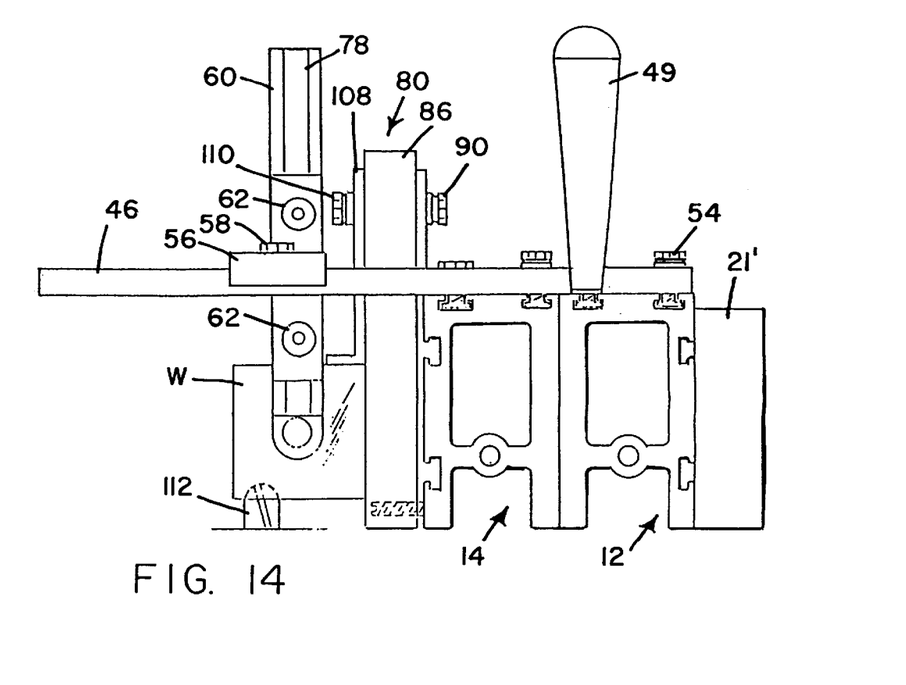
FIG. 14 is a rear elevational view of the fixture in its router mode.

The lateral clamping mechanism 120 includes a bracket 122 which is adjustably mounted on the bar 48 by means of a locking nut 124 that is threaded onto the end of a bolt 129 that is located within the T groove 52 and which extends through an aperture in the bracket 122. A vertical bar 126 is mounted to the bracket 122 for vertical adjustment thereon and is locked in place by a lock nut 130 which is threaded into a bolt 135 which is located in a T groove 128 in the bar 126 and which extends through a vertical wall of the bracket 122. A bracket 132 is mounted to the vertical bar 126 for vertical adjustment thereon, by means of a lock nut 134 and a corresponding bolt situated within the T slot 128. A threaded rod 138 is threaded into a threaded aperture in the bracket 132 for movement toward and away from the workpiece W. A finger gripping head 138 is fixed to one end of the rod 136. A workpiece engagement head 140 is fixed to the opposite end of the rod 136 for engaging the side of the workpiece which faces away from the rails 12 and 14, as shown in FIGS. 11 and 12. Alternatively, the bracket 132 can be dispensed with and the rod 136 can be threaded through a threaded aperture in the vertical bar 126. The opposite end of the workpiece is engaged by an adjustable stop 80 which is identical to the adjustable stop which is utilized at the tail end of the fixture. The adjustable stop 80 also includes a L-shaped bracket 108 for engaging the top of the workpiece to function as an upper stop for the workpiece and to also function as a reference point as the workpiece is intermittingly rotated about its longitudinal axis for subsequent milling cuts.

Referring to FIGS. 11 and 12, the fixture 10 is also provided with two types of stop mechanisms, generally indicated by the reference numerals 144 and 146. Stop mechanism 144 includes a bracket 148 that is mounted on the rail 14 for longitudinal adjustment by means of lock nuts 150 which are threaded to the ends corresponding of bolts located in T slots 152. The bracket 148 includes a projecting finger 154 for engaging the end edge of the router table 20' to limit the travel of the fixture 10 in accordance with the desired length of the flute being formed in the workpiece by the router blade 112. For longer workpieces and/or longer flutes to be formed in the workpiece, the stock mechanism 146 is utilized. The stock mechanism 146 includes an elongated rod 160 that extends into a longitudinal bore in either end of either of the rails 12 and 14. The end of the rod 160 has a transverse bend 162 for engaging the end edge of the router table 20'. The rod 160 is locked in place by a set screw, not shown, for eliminating the longitudinal travel of the fixture 10 when milling a longitudinal grooved or fluted in the workpiece W.

The following description illustrates how the fixture of the present invention can be utilized for forming angled milling cuts on a longitudinal four sided to produce, for example a table leg having four tapered sides. To begin with, an elongated workpiece W having a square cross-section is applied to the fixture 10 by placing the head end of the workpiece on the horizontal tab 98 and against the surface 97 of the head end retaining mechanism 18. The opposite or tail end of the workpiece is placed against the vertical bar 86 and on the horizontal tab 64 of the tail end retaining mechanism 60, as shown in FIG. 8. The supporting bracket 92 is shimmed to equal the 3/4 inch thickness of vertical bar 86, maintaining the workpiece 3/4 inch away from the second vertical guide surface 44 of the rail 14. The rail 14 is then pivoted about the hinge 36 relative to the rail 12 so that the angle of the second vertical guide surface 44 relative to the first vertical guide surface 38 and the surface 24 of the rip fence 21 is equal to the desired angle of the milling cuts to be taken on the workpiece. A center line on the tail end of the workpiece is established by making a mark at the end edge of each surface of the workpiece at the tail of the workpiece. The vertical bar 60 is adjusted relative to the workpiece W so that the center of the workpiece is aligned with a vertical center line on the surface of the bar 60 that faces the end of the workpiece. The workpiece is then locked in place by the clamping mechanism 99 and the hold-down mechanism 67. At this point, the workpiece is in position to take the first milling cut from the side of the workpiece which faces away from the rail 14. The rail 12 is positioned along the fence 21 so that the first vertical guide surface 38 abuts the surface 25 of the rip fence 21, as shown in FIG. 1. The fixture 10 is then moved along the rip fence into the saw blade 26. If multiple pieces are to be milled, as for example four table legs, the additional workpieces are placed on the fixture 10 in the same manner for making a first milling cut on each workpiece. Once a first cut has been made on each workpiece, the workpiece is rotated 90° about its central longitudinal axis so that a second milling cut is made on the surface which now faces away from the second rail 14. A second cut is also made on the additional workpieces in the same manner. After the second milling cut has been made, the workpiece is then clamped and rotated another 90° in the same direction as for the first rotation. However, at this point other adjustments have to be made before making the third milling cut. The head end of the workpiece is secured at the head end retaining mechanism 18 in the same manner as for the first two milling cuts. The center of the workpiece remains aligned with the center line of the bar 60. The adjustable stop 80 must be moved toward the workpiece to compensate for the material that was removed from the first side of the workpiece. The tail end of the workpiece is also locked down against the horizontal tab 64 by adjusting the hold-down mechanism 67. Once the third milling cut has been made, the stock is rotated once more and a final adjustment is made on the tail end retaining mechanism. After the workpiece has made its final 90° rotation, the head end of the workpiece is locked down by the head end retaining mechanism. This causes the workpiece to self level because the head end of the workpiece is square. The central longitudinal axis of the workpiece will extend horizontally and parallel to the work table of the table saw. The vertical bar 60 is adjusted upwardly so that the horizontal tab 64 abuts the lower surface of the workpiece. The hold-down mechanism 67 is then tightened and the workpiece is now in position for making the fourth and final milling. This enables the operator to achieve a table leg having four equal tapered sides, which was achieved with absolutely no angle changes to the fixture.

If more than four sides are to be made on a workpiece, as for example an octagonal tapered table leg, the table leg is milled to have four tapered sides in accordance with the previous discussion except that the tapered cuts extend along the entire length of the workpiece. In order to produce the octagonal tapers, the supporting bracket 92 is replaced by the supporting bracket 105, as shown in FIG. 9. This supports the workpiece so that two diagonally opposite corners of the workpiece are vertically aligned and the other two opposite diagonal corners of the workpiece are horizontally aligned, as shown in FIG. 9. The procedure for milling the four corners of the workpiece to achieve eight equal tapered sides is primarily the same as for milling the first four tapered sides. First, the head end of the workpiece W is secured, as shown in FIG. 9, by clamping the workpiece between the clamping mechanism 99 and the angled surfaces 107 and 109 of the supporting bracket 105. The workpiece W will self level so that the central longitudinal axis of the workpiece will be horizontal. The tail end retaining mechanism 16 is adjusted so that the center line of the surface of the vertical bar 60 which faces the end of the workpiece is aligned with the center of the workpiece. The vertical bar 60 is raised so that the horizontal tab 64 engages the bottom of the workpiece. The adjustable stop 80 is adjusted so that it engages the side of the workpiece facing the fixture 10. The hold-down mechanism 67 is adjusted to engage the top of the workpiece. After the first corner of the workpiece has been milled, the workpiece is unclamped and rotated 90° and reclamped. As in the case of milling the first four sides of the workpiece, no adjustments of the tail end retaining mechanism 16 is required until after the second corner cut. Thereafter, the adjustable stop 80 is adjusted toward the workpiece and the vertical bar 60 is moved upwardly to compensate for material that has been removed from the workpiece. By keeping the central longitudinal axis of the workpiece W parallel with the second vertical guide surface 44, no angle changes are required throughout the entire milling process. However, the central longitudinal axis must be determined prior to and maintained throughout the entire milling process. This can be accomplished by using shims of ½ inch, ¼ inch, ⅛ inch, and 1/16 inch which are positioned behind the vertical leg of the supporting bracket 92. It is also possible to adjust the supporting bracket 92 toward and away from the second vertical guide surface 44 by measuring the distance between the vertical surface 97 and the second vertical guide surface 44. Differences in stock thickness can also be compensated for by adjusting the rip fence 21.

If the workpiece is to be used for a table leg, a portion of the head end of the workpiece must be squared off in order for the leg to be properly mounted to the table. The workpiece W supported in the fixture 10 so that the central longitudinal axis of the workpiece is parallel to the second vertical guide surface 44. The locking nuts 54 at the second rail 14 are loosened and the second rail is pivoted so that the second vertical guide surface 44 is parallel with the first vertical guide surface 38. The rip fence 21 is adjusted so that the workpiece is positioned relative to the saw blade 26 so that a few inches of the workpiece at the head end are milled. After each milling cut, the workpiece is unclamped, rotated 45°, and reclamped. This procedure is repeated until all eight sides have been squared off at the head end of the workpiece. Either of the supporting brackets 92 and 105 can be used for this purpose.

If flutes, grooves, or mortises are to be milled into the sides of a tapered workpiece, the fixture 10 is positioned on the router table 20'. For this type of milling operation certain changes are made on the fixture. The most notable change is the movement of the bar 48 from the tail end of the fixture to the head end of the fixture, as shown in FIGS. 11 and 12, for supporting the clamping mechanism 114 and 120. At the tail end of the fixture, the vertical bar 60 is removed by loosening the locking nuts 62. The bar 60 is then inverted and then reapplied to the first bracket 56 so that the sharp projection 76 is at the lower end of the bar, as shown in FIG. 12. The sharp projection 76 is inserted into the tail end of the workpiece at the exact center of the workpiece. The toggle clamping mechanism 114 is applied to the head end of the workpiece so that the workpiece is clamped between the engaging head 118 and the bottom end of the vertical bracket 60. The workpiece W is positioned so that the central longitudinal axis of the workpiece is parallel to the top surface of the router table. The adjustable stop 80 is positioned against the side of the workpiece facing the fixture and the vertical lower leg of the L-shaped bracket 108 is positioned so that it abuts the upper end of the workpiece to function as a stop to prevent upward movement of the workpiece and to function as a reference surface. The lateral clamp 131 is applied to the surface of the workpiece facing away from the fixture 10. The head end of the workpiece is clamped between the work engaging head 140 and the vertical bar 86. The L-shaped bracket 108 at the tail end of the fixture is adjusted so that the lower vertical leg portion of the L-shaped bracket engages the upper surface of the workpiece. With the workpiece is supported at its ends, as shown in FIGS. 11 and 12, the fixture 10 is moved longitudinally along the fence 21' of the router table 20' so that the workpiece W passes over the router blade 112 to form a flute in one of its sides. After the flute has been formed in the first side, the workpiece W is unclamped and rotated 45° about its central longitudinal axis. The workpiece is reclamped and the fixture is moved longitudinally along the fence 21' to form a flute in a second side of the workpiece. This procedure is repeated until a flute has been formed on all eight sides of the workpiece. The L-shaped 108 accurately position the workpiece height wise in relation to the router blade 112 for each milling cut over the router blade. The vertical bars 86 accurately position the workpiece horizontally over the router blade 112 for each subsequent milling cut when forming flutes in the workpiece.

What is claimed is:

1. A fixture for use with a table saw for supporting an elongated workpiece having a head end, a tail end, an end surface at said tail end and a central longitudinal axis, said fixture enabling longitudinal tapered cuts to be made on said workpiece, wherein at least a portion of the head end of said workpiece retains its original cross sectional dimension after tapered cuts have been made in said workpiece, said table saw having a saw blade and a horizontal guide fence extending parallel to said saw blade, said fixture comprising:
    (a) a first rail having a first head end, a first tail end and a first vertical guide surface which extends longitudinally from said first head to said first tail end and which enables said fixture to engage said guide fence and to be guided longitudinally along said guide fence;
    (b) a second rail having a second head end, a second tail end and a second vertical guide surface that faces away from said first vertical guide surface and extends longitudinally from said second head end to said second tail end, said second head end being pivotally connected to said first head end so that said second vertical guide surface can assume a plurality of angular positions relative to said first vertical guide surface;
    (c) a head end retaining mechanism mounted on said second rail, said head end retaining mechanism having at least one vertical bracing surface which is parallel to said second vertical guide surface and which faces away from said second vertical guide surface for engaging the head end of said workpiece at one side of said workpiece and at least one horizontal bracing surface for engaging the head end of said workpiece to enable the head end of said workpiece to be located at a fixed point relative to said second vertical guide surface, said head end retaining mechanism being adapted for clamping the head end of workpiece so that the central longitudinal axis of said workpiece remains in a fixed position relative to said second vertical guide surface before and after longitudinal cuts have been made in said workpiece;
    (d) a tail end retaining mechanism mounted on at least one of said first and second rails, said tail end retaining mechanism comprising
        (1) a first stop having a first vertical stop surface which faces said head end retaining mechanism for engaging the end surface of said workpiece;
        (2) a second stop having a second vertical stop surface longitudinally spaced from said vertical bracing surface for engaging a side of the tail end of said workpiece that faces said second vertical stop surface; and
        (3) a third stop having a horizontal stop surface for engaging the top of the tail end of said workpiece, each of said second vertical stop and said horizontal stop being adjustable so that said second vertical stop surface and said horizontal stop surface are adjustably movable relative to said second vertical guide surface toward and away from said workpiece for maintaining said second vertical stop surface and said horizontal surface in contact with said workpiece for each longitudinal tapered cut that is made in said workpiece.

2. A fixture as recited in claim 1, wherein at least one of said tail end retaining mechanism and said head end retaining mechanism is adjustable horizontally toward and away from one of the other of said tail end retaining mechanism and said head end retaining mechanism.

3. A fixture as recited in claim 1, wherein said tail end retaining mechanism further comprises:
    (a) a bracket operatively connected to one of said first and second rails, said bracket having a horizontal tab for engaging the bottom of said workpiece and for supporting the tail end of said workpiece said bracket being vertically adjustable relative to said second vertical guide surface for clamping said workpiece between said horizontal tab and said horizontal stop surface.

4. A fixture as recited in claim 1, wherein said head end retaining mechanism comprises:
    (a) a supporting bracket having said vertical bracing surface for preventing said workpiece from moving toward said second vertical guide surface and a horizontal tab having said horizontal bracing surface for supporting said workpiece, and
    (b) a clamping mechanism for applying downward pressure on said workpiece for clamping said workpiece between said clamping mechanism and said horizontal bracing surface.

5. A fixture as recited in claim 4, wherein said supporting bracket is a replaceable primary supporting bracket and said head end retaining element comprises a replaceable secondary supporting bracket having a first upwardly facing supporting surface which extends downwardly away from said second vertical guide surface at a forty five degree angle and a second upwardly facing supporting surface which extends upwardly from said first supporting surface at a forty five degree angle, said secondary support bracket being adapted for supporting a workpiece having a square cross section so that the longitudinal surfaces of said workpiece are forty five degrees relative to said second vertical guide surface to enable the corners of said workpiece to be cut to produce a workpiece having a octagonal cross section.

6. A fixture as recited in claim 1, wherein said tail end retaining mechanism comprises:
    (a) a first horizontal bar mounted on one of said first and second rails for longitudinal movement toward and away from said head end retaining mechanism;
    (b) a first bar lock for releasably locking said first horizontal bar against longitudinal movement relative to said first and second rails;
    (c) a second horizontal bar mounted on one of said first and second rails for longitudinal movement toward and away from said head end retaining mechanism;
    (d) a second bar lock for releasably locking said second horizontal bar against longitudinal movement relative to said first and second rails; and
    (e) a bracket mounted on said first horizontal bar for adjustment toward and away from said second vertical guide surface, said first bracket having a horizontal tab, said bracket being vertically adjustable relative to said first horizontal bar for enabling said tab to engage the bottom of said workpiece for supporting said workpiece and for clamping said workpiece between said horizontal tab and said horizontal stop surface.

7. A fixture as recited in claim 1, wherein said first vertical stop surface has a vertical line and said first stop is adjustably mounted on said fixture for movement toward and away from said second vertical guide surface so that said vertical reference line intersects the central longitudinal of said workpiece prior to making said longitudinal tapered cuts and said vertical reference line thereafter serving as a reference line for said longitudinal axis after at least two of said longitudinal tapered cuts have been made in said workpiece.

8. A fixture as recited in claim 1, wherein said tail end fixture and said head end fixture are adapted to support said workpiece so that the bottom of said workpiece is completely exposed to enable a cut to be made by the saw blade in the bottom of said workpiece.

9. A fixture as recited in claim 8, wherein said tail end retaining mechanism comprises a bracket that has a sharp ended protuberance facing said head end retaining mechanism for being embedded into the tail end of said workpiece for supporting the tail end of said workpiece, and wherein said head end retaining mechanism includes a clamping mechanism for applying a force to the head end of said workpiece toward said protuberance for maintaining said workpiece in a fixed horizontal position for being passed longitudinally over said saw blade.

10. A fixture as recited in claim 9, wherein said head end retaining mechanism comprises:

(a) a lateral clamping mechanism for engaging opposite lateral sides of said workpiece to fix said workpiece against horizontal movement laterally of said second vertical guide surface; and (b) a vertically adjustable hold-down bracket for engaging the top of said workpiece to prevent the head end of said workpiece from moving upwardly beyond a selected vertical position.

11. A fixture as recited in claim 10, wherein said lateral clamping mechanism comprises:

(a) a brace for engaging a portion of said workpiece which faces said second vertical guide surface; and (b) a horizontally adjustable plunger for engaging a portion of said workpiece which faces away from said second vertical guide surface.

12. A fixture as recited in claim 8, wherein said tail end retaining mechanism comprises:

(a) an adjustable stop for engaging the side of said workpiece which faces said second vertical guide surface for preventing said workpiece from moving horizontally and laterally toward said second vertical guide surface; and (b) a vertically adjustable hold-down bracket for engaging the top of said workpiece to prevent the tail end of said workpiece from moving upwardly beyond a selected vertical position.

\* \* \* \* \*